US006583394B2

United States Patent
Araya et al.

(10) Patent No.: US 6,583,394 B2
(45) Date of Patent: Jun. 24, 2003

(54) APPARATUS AND METHOD FOR PROCESSING CERAMICS

(75) Inventors: Carlos R. Araya, Woodhull, NY (US); Magdy F. Iskander, Salt Lake City, UT (US); Elizabeth M. Vileno, Corning, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 10/034,488

(22) Filed: Dec. 21, 2001

(65) Prior Publication Data

US 2002/0139795 A1 Oct. 3, 2002

Related U.S. Application Data

(60) Provisional application No. 60/258,944, filed on Dec. 29, 2000.

(51) Int. Cl.$^7$ .................................................. H05B 6/70
(52) U.S. Cl. .............................. 219/685; 219/691
(58) Field of Search ....................... 219/685, 691, 219/699, 681, 684, 700, 718, 701, 715, 756, 405–406, 399, 411, 417, 710; 343/768, 771, 770

(56) References Cited

U.S. PATENT DOCUMENTS

| | | | |
|---|---|---|---|
| 3,365,562 A | | 1/1968 | Jeppson |
| 3,858,022 A | | 12/1974 | Smith |
| 4,057,702 A | * | 11/1977 | Lacombe-Allard .......... 219/701 |
| 4,164,742 A | | 8/1979 | Nemit |
| 4,176,267 A | * | 11/1979 | Rueggeberg .............. 219/699 |
| 4,180,918 A | | 1/1980 | Ostrowski |
| 4,405,850 A | | 9/1983 | Edgar |
| 4,728,531 A | | 3/1988 | Matz et al. |
| 4,857,245 A | | 8/1989 | Oshima et al. |
| 5,064,979 A | | 11/1991 | Jaeger |
| 5,191,183 A | | 3/1993 | Balbaa et al. |
| 5,406,058 A | | 4/1995 | Lipp |
| 5,457,303 A | * | 10/1995 | Shute et al. ............... 219/700 |
| 5,510,601 A | | 4/1996 | Smith et al. |
| 5,521,360 A | | 5/1996 | Johnson et al. |
| 5,813,134 A | | 9/1998 | Min et al. |
| 5,837,978 A | | 11/1998 | Hatzakis, Jr. et al. |
| 6,025,580 A | | 2/2000 | Yagi |
| 6,172,346 B1 | * | 1/2001 | Wroe ......................... 219/681 |
| 6,344,634 B2 | | 2/2002 | Brennan |
| 6,344,635 B2 | | 2/2002 | Brennan |
| 6,376,817 B1 | | 4/2002 | McFadden et al. |
| 6,388,632 B1 | | 5/2002 | Murakawa et al. |

FOREIGN PATENT DOCUMENTS

| | | | |
|---|---|---|---|
| DE | 272168 A | * | 6/1988 |
| WO | WO 97/44626 | | 11/1997 |
| WO | WO 98/01747 | | 1/1998 |
| WO | 02/054830 A3 | | 9/2002 |

OTHER PUBLICATIONS

M. J. White, M. F. Iskander, and Z. Yun, "A new 3D FDTD Multigrid Technique with Dielectric Traverse Capabilities", IEEE Transactions on Microwave Theory and Techniques, vol. 49, No. 3, pp. 422–430, Mar. 2001.

M. J. White, M. F. Iskander, and Z. Huang, "Development of a Multi-Grid FDTD Code for Three Dimensional Applications", IEEE Transactions on Antennas and Propagation, vol. 45, No. 10, pp. 1512–1517, 1997.

* cited by examiner

Primary Examiner—Quang T. Van
(74) Attorney, Agent, or Firm—Timothy M. Schaeberle; Kees van der Sterre

(57) ABSTRACT

Apparatus and a method for processing a ceramic material includes placing the ceramic material in a microwave heating apparatus having a microwave cavity; subjecting the ceramic material to a combination of microwave radiation and conventional heat; and controlling the uniformity of the processing of the ceramic material so as to avoid deformations and cracking by applying the microwave radiation to the ceramic material through at least one branched slotted waveguide which substantially uniformly distributes the microwave radiation throughout the microwave cavity.

16 Claims, 3 Drawing Sheets

APPARATUS AND METHOD FOR PROCESSING CERAMICS

This application claims the benefit of U.S. Provisional No. 60/258,944, filed Dec 29, 2000 entitled "Apparatus and Method for Processing Ceramics", by Araya.

BACKGROUND OF THE INVENTION

The invention relates to an apparatus and method for processing ceramic materials. In particular, this invention relates to an apparatus and method for processing ceramic materials involving a combination of microwave and conventional heating, and more particularly to an apparatus and method for controlling the field density of the microwave power through slotted waveguides to uniformly distribute the power throughout the ceramic material, maximizing power absorption by the ware and minimizing power absorption by its surroundings.

Conventional heating used in the manufacturing of ceramic materials typically utilizes radiative gas flame, electric resistance heating, and the like. Utilization of conventional heating typically results in a thermal differential within the ceramic material. This differential is due, in part, to the fact that radiant heating is applied only to the surface of the material and it relies on the thermal conductivity of the material, typically poor, to transmit the thermal energy beneath the surface and into the interior of the piece. In other words, conventional heating involves heat transfer that is predominantly achieved by radiation or convection to the surface followed by conduction from the surface into the interior of the ceramic body. If a core-surface thermal differential develops that is too great, internal cracking and distortion of the ceramic material can occur. Fast firing further exacerbates this problem of poor heat transfer, and ultimately cracking.

Additionally, the presence of a core-surface thermal gradient can also result in uneven sintering, specifically surface sintering prior to, and at a faster rate than, interior sintering. As a result, the ceramic material may exhibit non-uniform properties.

Solutions to these problems have been proposed which involve reducing the rate of heating or allowing lengthy holds at certain temperatures. Each of these solutions allows heat energy to be conducted into the core of the ceramic material, which in turn, allows the temperature of the core of the ceramic material to "catch up" with that of the surface, thereby minimizing the surface/core temperature differential. Unfortunately however, the theoretical limits of conventional heating typically result in slow heating rates for most ceramic materials, the exception being ceramic pieces exhibiting small dimensions.

Microwave heating of ceramics has alternatively been successfully used to fire ceramic materials. In comparison with conventional heating, microwave heating involves depositing energy directly within the ceramic material in accordance with a volumetric heating mechanism. More specifically, the utilization of microwave energy involves delivering energy to the entire cross section of the ceramic article, rather than to the article surface. Although microwave heating of ceramic materials is much faster than conventional heating because of this volumetric heating, when used alone, it, like conventional heating, results in the ceramic article exhibiting a thermal differential, albeit an opposite thermal differential with the core of the ceramic article exhibiting a higher temperature than that of the surface. Specifically, as the ceramic materials are heated with microwaves to high temperatures, the interior of the ceramic article very rapidly begins to absorb substantial amounts of microwave energy; this effect is known as thermal runaway.

Although the surface is heated along with the core of the ceramic material, the surface rapidly loses much of its heat energy to the surroundings, which is typically cooler than the ceramic material average temperature. As the core starts to preferentially absorb the microwave energy this thermal runaway phenomenon becomes self-propagating. Simply stated, as the temperature of the ceramic material increases, the heat losses become greater, and the magnitude of the core-surface thermal differential increases, again leading to thermal stress within, and ultimately cracking of, the ceramic article.

In addition to heat losses from the surface of the ceramic article, non-uniformity of the microwave distribution within the kiln and non-uniform material properties of the ceramic article lead to differential absorption of the microwave energy by the ceramic article, and contribute to the microwave heating thermal differential.

Hybrid microwave/conventional heating or microwave assisted heating has been proposed as an alternative to overcome the problems of conventional-only and microwave-only heating. In microwave assisted heating involving both microwave and conventional heating, the volumetric heating provided by the microwaves heats the components, while the conventional heating provided by gas flame or electric resistance heating elements minimizes heat loss from the surface of the components by providing heat to the surface and its surroundings. This combination of hybrid heating can result in heating that avoids thermal profiles associated with conventional-only and microwave-only firing. As a result, thermal stresses can be reduced and or minimized and thus the ceramic articles can be heated more rapidly.

Although various methods of implementation have been proposed, it can be difficult to coordinate the respective microwave and conventional power inputs to achieve optimal uniform heating of the ceramic article. Variations on microwave-assisted ceramic firing standard control methods are disclosed in PCT Applications WO 95/05058 and WO 93/12629 and U.S. Pat. No. 5,191,183. These documents generally disclose methods of independently controlling the quantities of heat generated in the ceramic article by the microwave energy and radiant heat by measuring the ambient temperature within an enclosure containing the ceramic article. Based on, and in response to, this ambient temperature measurement, the heat generated in the ceramic article is controlled by one or both of the microwave energy or radiant heat. Although this type of control method is an improvement over prior conventional control methods, the non-uniform mixing of kiln gases and the effects of chemical reactions that occur within the ceramic material make it difficult to accurately predict the ceramic article surface and internal temperatures.

Heating uniformity is of paramount importance in most industrial heat treating applications. Typically, multiple ceramic articles are stacked in layers within the kiln to increase productivity. This increases the importance of uniform distribution of suitable amounts of thermal energy within the kiln to assure that each ceramic piece is fired properly, thus avoiding burning, cracking or other undesirable results. Uniform distribution is particularly critical in the case of relatively fragile green thin-walled ceramic honeycomb structures where minimal heating stresses must be maintained in order to produce crack-free ware in commercial quantities and acceptable process yields.

Methods to improve the dispersion of microwave power include the use of stirrers at the end of waveguides or in other parts of the microwave cavity. Although, stirrers placed in front of microwave ports help to randomize the power distribution, they are associated with other problems such as high reflectance and the need to add tuners to the waveguide to minimize the potential damage of this reflected power, and the need for maintenance with moving parts in a hot environment.

Alternatives to the use of stirrers include the use of multiple waveguides and slotted waveguides in an effort to distribute the power more evenly. However, to date, the art lacks a kiln configuration which provides for the desired uniform distribution of the microwave heating power which enables increased power absorption by each article or part of the ware.

U.S. Pat. No. 4,164,742 relates to a slotted-waveguide type beam-forming antenna array as commonly employed in radar systems. The purpose of this waveguide array is to produce multiple beams from a slot array aperture. Two waveguides having coupling slots are joined at a common boundary to form discrete beams for radar applications. Beam splitting would not be useful to provide a uniform heating pattern in a kiln for processing ceramics.

SUMMARY OF THE INVENTION

Accordingly, one aspect of the present invention is to provide an apparatus and method for uniformly dispersing the microwave power in a combined microwave and conventional heating system utilized in the heating of ceramics that overcomes the shortcomings of the aforementioned systems.

In accordance with another aspect of the present invention, there is provided a method for processing a ceramic material, including a plurality of ceramic articles, which comprises placing the ceramic material in a microwave heating apparatus having a microwave cavity. The ceramic material is subjected to a combination of microwave radiation and conventional heat. The uniformity of the processing of the ceramic material is controlled so as to avoid deformations and cracking by applying the microwave radiation to the ceramic material through at least one and preferably an array of slotted waveguides, most desirably branched slotted waveguides. The waveguide or waveguides are configured to substantially uniformly distribute the microwave radiation throughout the microwave cavity.

The uniformity of distribution is such that the maximum deviation between the microwave power delivered to a ceramic article in a first position within the cavity and that delivered to a ceramic article in a second position within the cavity is no greater than about 25%, as measured in a static system. Further, this uniformity of power distribution is maintained under conditions wherein the power input to the ceramic ware within the microwave cavity is maintained at a level equal to or exceeding $15 \times 10-3$ mW/m2.

In accordance with another aspect of the present invention, there is provided an apparatus including a conventional heat source in communication with a microwave cavity. A microwave power source is in communication with the microwave cavity through at least one slotted waveguide. The at least one slotted waveguide substantially uniformly distributes the microwave radiation throughout the microwave cavity such that the power into a ceramic material in the microwave cavity is above about $15 \times 10-3$ mW/m2 and the maximum deviation between the microwave power supplied to the ceramic material in a first defined area and that supplied to the ceramic material in a second defined area within the cavity is no greater than about 25%, as measured in a static system.

DETAILED DESCRIPTION OF THE INVENTION

Figure 1:
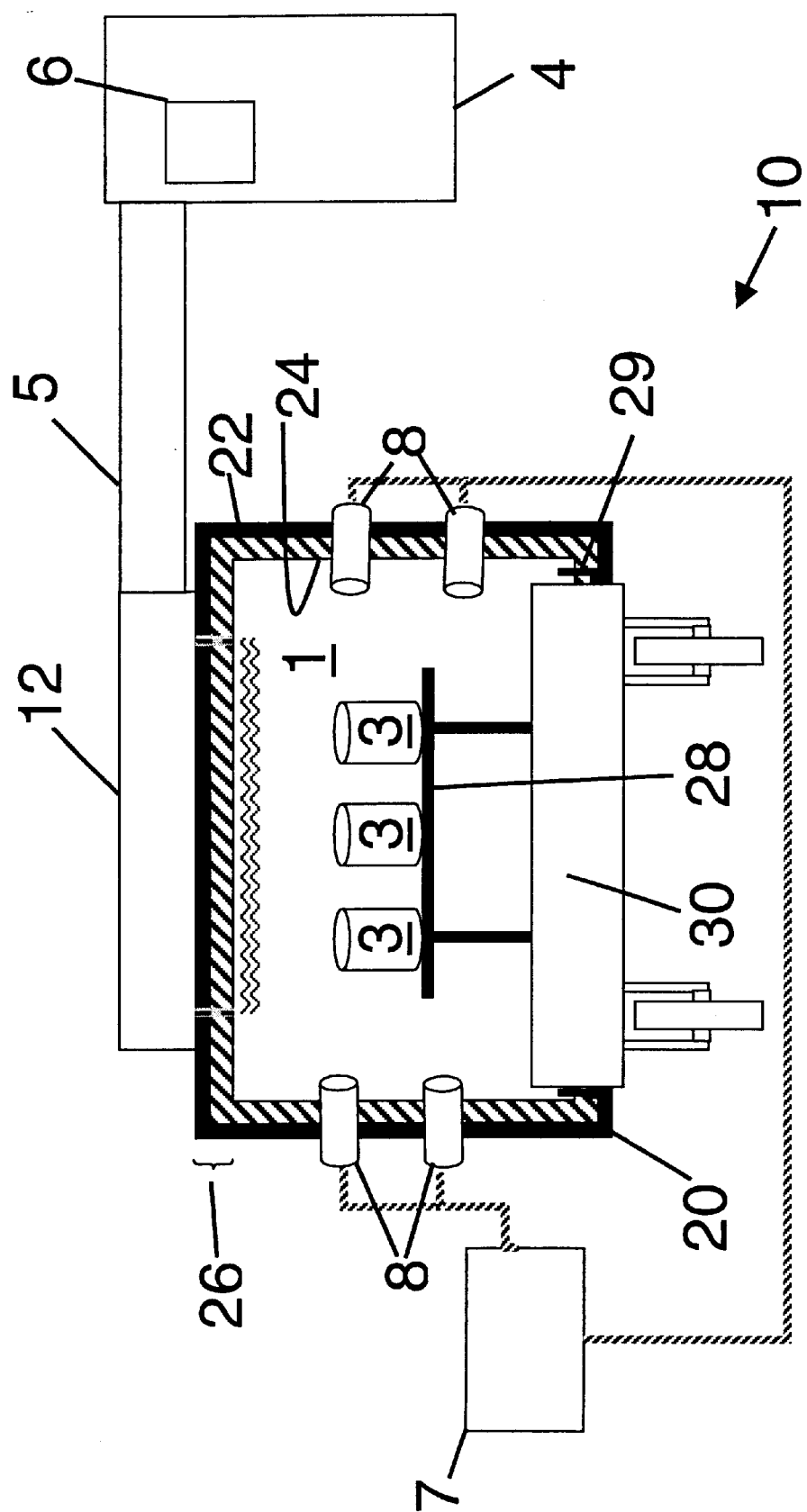
FIG. 1 is a side plan view of an apparatus according to the present invention.

The present invention relates to a method for processing a ceramic material including placing the ceramic material in a microwave heating apparatus having a microwave cavity; subjecting the ceramic material to a combination of microwave radiation and conventional heat; and controlling the uniformity of the processing of the ceramic material so as to avoid deformations and cracking by applying the microwave radiation to the ceramic material through at least one slotted waveguide, which substantially uniformly distributes the microwave radiation throughout the microwave cavity such that the power into the ceramic material is above about $15 \times 10-3$ mW/m2 and the maximum deviation between the microwave power supplied to the ceramic material in a first defined area and that supplied to the ceramic material in a second defined area within the cavity is no greater than about 25%, as measured in a static system.

Preferably, according to the method the power into the ceramic material is above about $17 \times 10-3$ mW/m2 and the maximum deviation between the microwave power supplied to the ceramic material in a first defined area and that supplied to the ceramic material in a second defined area within the cavity is no greater than about 22%.

More preferably, according to the method the power into the ceramic material is above about $17.5 \times 10-3$ mW/m2 and the maximum deviation between the microwave power supplied to the ceramic material in a first defined area and that supplied to the ceramic material in a second defined area within the cavity is at or below about 17%.

In another embodiment, the present invention relates to an apparatus including a conventional heat source in communication with a microwave cavity; and a microwave power source in communication with the microwave cavity through at least one slotted waveguide, which substantially uniformly distributes the microwave radiation throughout the microwave cavity such that the power into a ceramic material in the microwave cavity is above about $15 \times 10-3$ mW/m2 and the maximum deviation between the microwave power supplied to the ceramic material in a first defined area and that supplied to the ceramic material in a second defined area within the cavity is no greater than about 25%, as measured in a static system.

Preferably, according to the apparatus the power into the ceramic material is above about 17×10−3 mW/m2 and the maximum deviation between the microwave power supplied to the ceramic material in a first defined area and that supplied to the ceramic material in a second defined area within the cavity is no greater than about 22%.

More preferably, according to the apparatus the power into the ceramic material is above about 17.5×10−3 mW/m2 and the maximum deviation between the microwave power supplied to the ceramic material in a first defined area and that supplied to the ceramic material in a second defined area within the cavity is at or below about 17%.

For the purpose of the present description, a static system is a heating system wherein the ware is not moved during heating and wherein there are no moving mechanical parts in the microwave cavity during heating, such as stirrers, turntables, moving antennas, or the like. Although the invention is not limited in its utility to static systems, power measurements taken in a static system are useful for purposes of comparing incident power levels and microwave field uniformity among various waveguide configurations and hybrid kiln designs.

A slotted waveguide is an microwave radiation distribution device that has a slotted configuration, wherein the slots allow the microwave radiation to escape, radiate, and/or leak through the side of the waveguide into the apparatus.

The generator source employed to generate the microwaves in accordance with the invention can constitute any conventional magnetron with an adjustable power feature, or other microwave source. Preferably, the frequency of incident microwave used will be in a designated Industrial Scientific Medical ("ISM") band for the country of use, e.g., at about 915 MHz or 2.45 GHz for the United States. In other countries similar frequencies are designated ISM bands. The power of the incident microwave need be no greater than that sufficient to raise the temperature of the ceramic article to a temperature effective for heating of the ceramic article. Specifically, each microwave generator should possess variable power levels ranging up to about 100 kW.

In a typical system, a temperature measurement system capable of measuring both the ceramic article's surface temperature and the temperature proximate the center of the ceramic article, i.e., the core temperature, is coupled to a control unit. That control unit independently controls the microwave power source/controller and the conventional heat source/controller. This control unit preferably includes a combination of a programmable logic controller ("PLC") and a computer. The temperature measurement system incorporates temperature sensors capable of measuring both surface and core temperature of the ceramic article. The term core as used herein refers to the interior portion of the ceramic article at or near the center of the particular ceramic article, however the core temperature can be measured at any position in the interior of the ceramic article to accurately reflect the temperature of the core. Suitable sensors include, for example, a pyrometer (or other thermographic device), a sheathed thermocouple, light pipe or black body probe. In a preferred embodiment the sensors constitute sheathed thermocouples including a forwardly extending temperature probe in the form of a type S or type B thermocouple ungrounded and housed in a grounded platinum or other high temperature electrically conductive sheath.

In commercial operation, the ceramic material processed with both electromagnetic microwave radiation and conventional heat to control core and surface temperatures. Ceramic articles are placed in a microwave heating apparatus having a microwave cavity and are subjected to a controlled combination of microwave radiation and conventional heat. The amount of microwave radiation and conventional heat are such that the ceramic article is heated according to a predetermined time-temperature profile. The time-temperature profile, ranging from room temperature to the sintering soak temperature, is determined so as to heat the ceramic article to its sintering soak temperature in the minimum time while still allowing for the production of a ceramic article that, following the subsequent hold at the sintering soak temperature, exhibits the required characteristics of the ceramic material, specifically, a crack-free, undistorted ceramic article having the targeted properties.

FIG. 1 shows a basic firing system 10 for firing ceramic articles according to the invention. System 10 includes a microwave powered kiln 20 incorporating a microwave cavity 1 within which are located a plurality of ceramic articles 3 (e.g., ceramic honeycomb structures) to be fired. Kiln 20 includes a shell 22 of non-magnetic material such as aluminum or non-magnetic stainless steel. The shell is lined on all inside walls with high temperature, low loss insulation 24 such as alumina kiln insulation K VS-72 or similar high purity alumina.

A microwave generator 4, for example a magnetron, is coupled directly or indirectly to cavity 1 via a waveguiding conduit or conduits 5 connecting to a slotted waveguide or waveguide array 12. Microwave energy from the waveguide array is directed into cavity 1 via ports (not shown) in roof 26 of kiln 20. Microwave generator 4 includes a microwave power source/controller 6 for continuously adjusting the microwave power in cavity 1.

Also provided is an independently controlled conventional heat source/controller 7, the latter being adapted to control conventional heat sources 8 for heating cavity 1. Suitable heat sources 8 may comprise convective or radiative heating devices, including but not being limited to conventional electric resistance or gas burner elements adapted to heat in either a direct or indirect firing configuration.

Ceramic articles 3 to be fired in kiln 20 may be supported therein by means such as a kiln car 30, the latter typically be made of metal. Microwave chokes 29 are generally positioned between the wall of the kiln and the car 30 to prevent leakage of the microwave power. Kiln car 30 may be provided with one or more shelves or supports 28 made of high temperature material, such as silicon carbide, to support the articles to be fired.

Figure 2:
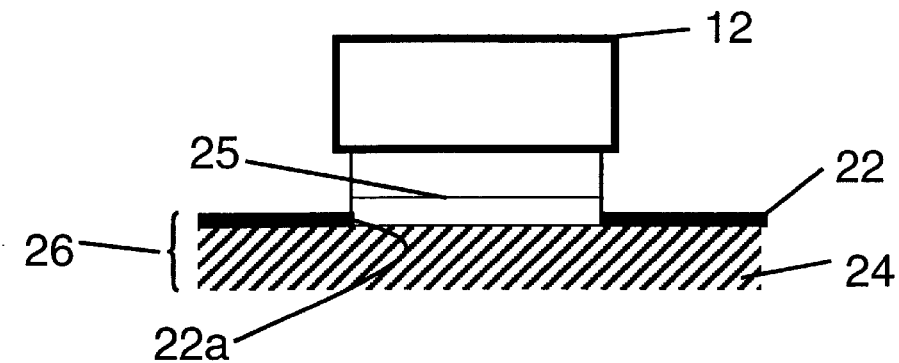
FIG. 2 is a side elevation view of a detail of an apparatus according to the present invention.

FIG. 2 presents a schematic cross-sectional end view of a section of a roof 26 of a hybrid kiln on which a waveguide 12 is mounted. Waveguide 12 is positioned over a port 22a in shell 22 of the roof so that microwave power from the waveguide can be directed through this port and through insulation 24 into the kiln cavity below. Slotted waveguides such as waveguide 12 may also or alternatively be located at other positions on the kiln, including the kiln sides, although roof mounting is often most convenient. The slotted waveguide is protected from the kiln atmosphere by a vapor shield 25, preferably made of high purity quartz glass or other low loss materials such as mica, that can be positioned in a transition section between the kiln shell and the waveguide and mounted therein by a silicone rubber cement.

Figure 3:
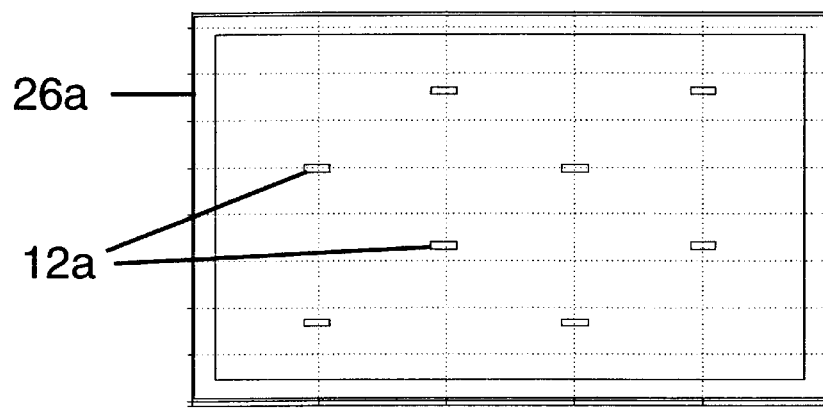
FIG. 3 is a top plan view of a waveguide configuration of the prior art showing 8 standard feed ports.
Figure 4:
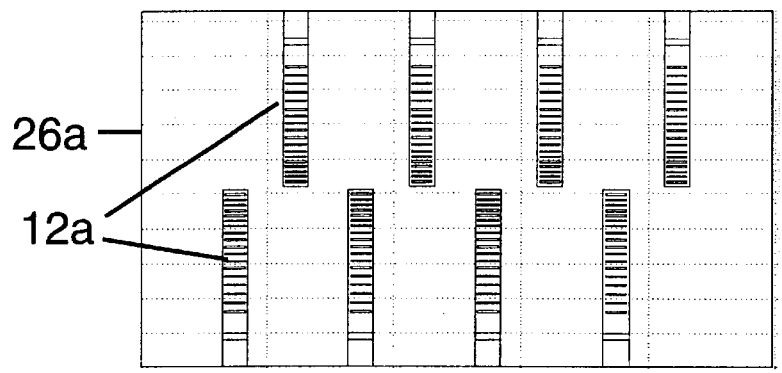
FIG. 4 is a top plan view of a waveguide configuration of the prior art showing 8 straight slotted waveguides.

FIG. 3 is a schematic plan view of a prior art waveguide arrangement for a microwave-powered kiln wherein 8 conventional waveguides 12a direct microwave power through a kiln roof 26a. In this type of configuration the power reflection coefficient configuration is about 7.8%. For purposes of the present description the power reflection coefficient is defined as the amount of reflected power divided by the amount of incident power times 100. FIG. 4 shows another waveguide configuration of the prior art wherein 8 straight slotted waveguides 12a are positioned to direct power through kiln roof 26a. The power reflection coefficient of this configuration is about 5%.

Figure 5:
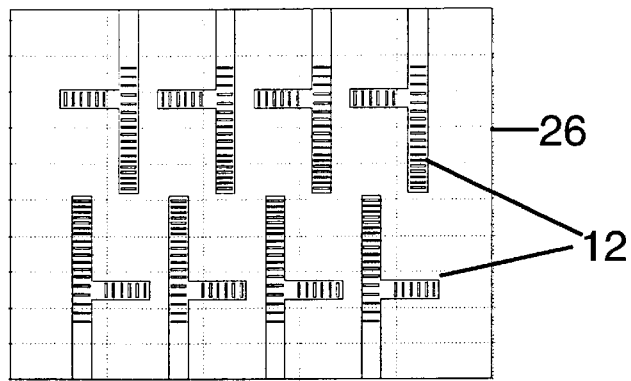
FIG. 5 is a top plan view of a waveguide configuration of the present invention showing 8 slotted T waveguides.

The waveguide arrangements of FIGS. 3 and 4 do not provide the uniformity of microwave power distribution required to minimize ceramic piece distortion and/or cracking at the microwave input power levels necessary for the effective firing of ceramic products such as thin-walled ceramic honeycomb structures. FIG. 5 of the drawings, on the other hand, shows a waveguide configuration of the present invention that does provide the necessary uniformity.

Figure 6:
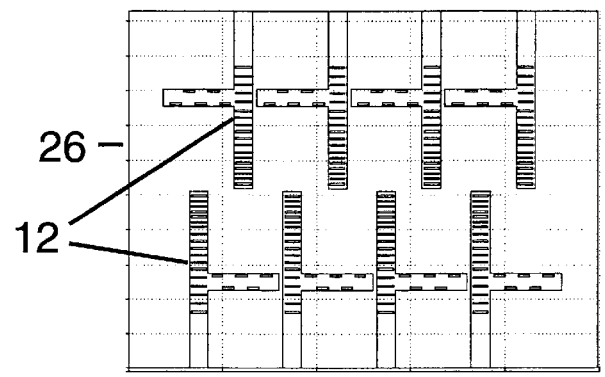
FIG. 6 is a top plan view of a waveguide configuration of the present invention showing 8 slotted T waveguides.

Referring more particularly to FIG. 5 there is schematically illustrated an arrangement of 8 branched slotted waveguides 12, these being referred to as slotted "T" waveguides and being suitably positioned to direct microwave power through a kiln roof 26 with sufficient uniformity to achieve low cracking levels in ceramic materials or articles within the kiln. The power reflection coefficient of this configuration is about 5.3%. An effective alternative arrangement for a set of slotted "T" waveguides 12 is illustrated in FIG. 6 of the drawing, that configuration being characterized by a power reflection coefficient of about 3.2%.

Figure 7:
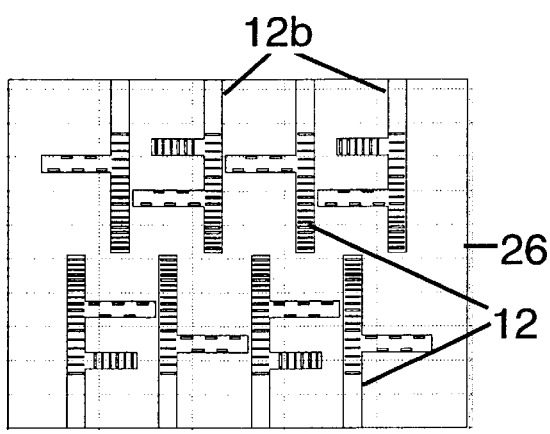
FIG. 7 is a top plan view of a waveguide configuration of the present invention showing 4 slotted T and 4 slotted double T waveguides.
Figure 8:
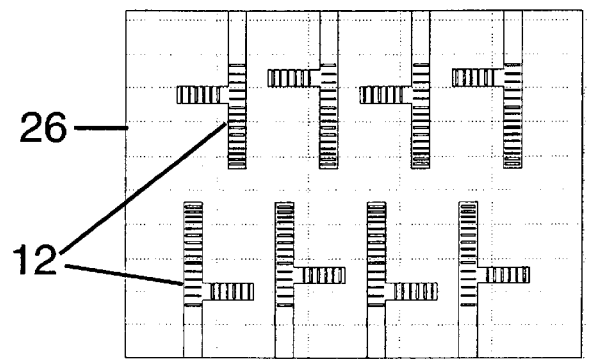
FIG. 8 is a top plan view of a waveguide configuration of the present invention showing 8 slotted staggered T waveguides.

FIG. 7 shows another branched waveguide configuration of the present invention having 4 slotted "T" waveguides 12 and 4 slotted double "T" waveguides 12b positioned to deliver microwave energy through a kiln roof 26. The power reflection coefficient of this configuration is about 3.6%. FIG. 8 of the drawings shows yet another waveguide configuration in accordance with the invention having 8 slotted staggered "T" waveguides 12 on top of the microwave cavity. The power reflection coefficient of this configuration is about 4.4%.

The "T" design for branched slotted waveguides useful in accordance with the present invention provides an improved uniformity of microwave power dispersion as compared to prior art designs. While the slotted waveguide of the present invention is depicted in the figures as having a "T" or double "TT" configuration, the present invention is not limited to such configuration and is meant to include other branched waveguide configurations having other geometry.

Advantages of the branched slotted waveguides of the present invention are several. For example, higher efficiency, as exhibited by the lower reflection coefficient measured at the feed ports of hybrid kilns incorporating such waveguides is a characteristic feature of these waveguide designs. Poorly designed ports exhibiting a higher reflection coefficient may result in sparking and often require cooling systems. Further, the higher reflection coefficients observed at feed ports supplied by waveguides of more conventional prior art design often require special insulation designs, materials, and construction. Such costly measures are not typically required for the more efficient slotted waveguides of the present invention.

Waveguide designs such as those shown in the prior art may also require mode stirrers. These stirrers can themselves cause sparking, particularly in humid environments such as can develop within firing kilns, increasing the risk of kiln fires in some cases. And, they constitute moving parts which, in the hot moist environment of a firing kiln, require maintenance that is better avoided.

Variations on the particular waveguide designs shown in the foregoing and following illustrative examples of the invention may of course be made for the purpose of adapting waveguide performance to the specific requirements of the particular equipment and application involved. For example, the size of the slots may be modified to control the amount of radiated microwave power, which power continues to propagate from the input port to the end of a slotted waveguide arrangement. Also, the number of slots, distance between slots, and orientation of the slots can be adjusted and designed so as to improve the resulting power uniformity. Coupling holes can be employed to control the amount of power in each branch of the waveguide array.

Adjustments in slot orientation may be made to reduce constructive interference, leading to a lower concentration of hot spots. A graduated distribution of slots with increasing distance from the source as illustrated in FIGS. 5–8 of the drawings can allow for more uniform leakage of the waves. Most importantly, the side legs of the "T" or other branched waveguide configuration can be varied in design to improve the overall uniformity of the microwave power deposition pattern in the heating cavity. Finally the positioning of the waveguides with respect to the cavity and load can be varied to achieve a required level of power distribution uniformity.

In combination, these variations can improve the uniformity of the power deposition pattern while maintaining minimum reflected power at the input ports. Minimum reflected power to the generator provides improved damage protection and increased life time for the generator as well as lower power concentrations (standing waves) at input ports to minimize possible arcing and breakdown associated with such concentration.

The waveguide arrangements hereinabove described can be used for low or high temperature applications. In fact, microwave heating can be used alone for certain types of ceramics where the difference in temperatures from the ambient to the load is low, preferably less than about 150° C.

By reducing overall power density at the waveguide-to-cavity interface, the waveguide designs herein described provide a more efficient delivery of the power to the cavity. This allows for the simplification of the delivery port arrangement, eliminating the need for stirrers and tuners. Additionally, in high temperature applications where insulation must be provided in front of the microwave port, the lower power density minimizes the probability of insulation damage or overheating. Thus higher levels of power may be applied to the load and reductions in cycle time or other process improvements can be realized.

The waveguide interfaces can also be varied as required for purposes of the particular application involved. One possibility is to utilize the waveguide sidewalls as support members for microwave cavities wherein the need for extra firing space could otherwise preclude the inclusion of waveguides. In one such implementation, one side of a structural stainless steel I-beam for kiln support is also used as a waveguide sidewall. Another option is to machine microwave slots directly in the roof or sidewall of the heat treating chamber to reduce overall manufacturing costs for the waveguide components of the firing system.

The invention may be further understood by reference to the following specific examples, which are intended to be illustrative rather than limiting. The examples comprise studies done for various cases involving heating ceramic articles or materials in a heating apparatus having a microwave cavity and subjecting the ceramic material to a combination of microwave radiation and conventional heat. The heating apparatus used was provided for some of the cases with a series of conventional standard waveguides or conventional straight slotted waveguides, and for other cases with "T"-shaped slotted waveguides in accordance with the invention. Table 1 sets forth individual case results and Table 2 presents averaged case results from these studies.

For all of the data reported in the examples, eight waveguides were employed to distribute the available microwave power. The power into the ware was normalized to 5 V/m in each of the eight waveguides used in each case.

For the purpose of these examples microwave power levels are reported in mw/m2, and are calculated using a multigrid finite difference time domain code developed at the University of Utah. See, for example, M. J. White, M. F. Iskander, and Z. Yun, "A new 3D FDTD Multigrid Technique with Dielectric Traverse Capabilities", IEEE Transactions on Microwave Theory and Techniques, Vol. 49, No. 3, pp. 422–430, March 2001, and also M. J. White, M. F. Iskander, and Z. Huang, "Development of a Multi-Grid FDTD Code for Three Dimensional Applications", IEEE Transactions on Antennas and Propagation, Vol. 45, No. 10, pp. 1512–1517, 1997, which are herein incorporated by reference in their entirety. Total power absorbed can vary with formulation and size of the ware but the trend will remain the same from case to case.

TABLE 1

Individual Case Results

|  | Case Number | Power into the Ware, mW/m² e-3 | Deviation Across Rows (as a % of Power into Ware) | Deviation Across Columns (as a % of Power into Ware) |
|---|---|---|---|---|
| Stand- | 1 | 11.0 | 23.3 | 15.7 |
| ard Port | 19 | 15.4 | 14.7 | 28.6 |
| Designs | 3 | 11.9 | 17.0 | 13.5 |
| Straight | 5 | 17.7 | 30.7 | 21.9 |
| Slotted | 6 | 18.1 | 35.0 | 27.3 |
| Wave- | 21 | 16.2 | 34.5 | 25.0 |
| guide | 7 | 17.4 | 27.0 | 19.0 |
| Designs | 22 | 16.3 | 29.6 | 24.3 |
| Present | 9 | 17.9 | 17.0 | 14.3 |
| Inven- | 12 | 18.0 | 20.1 | 21.5 |
| tion | 28 | 17.7 | 18.1 | 16.5 |
|  | 30 | 17.6 | 16.7 | 18.2 |

TABLE 2

Averaged Results of Source Type

| Source Type and Configuration | Power into the Ware mW/m2 e-3 | Std Deviation as a percentage of power averaged across rows. | Std Deviation as a percentage of power averaged across columns. | Comments |
|---|---|---|---|---|
| Standard feed ports (3 cases) | 12.7 | 18.3% | 19.3% | Low deviation across ware, but low power into ware |
| Straight slotted waveguide (5 cases) | 17.1 | 31.4% | 23.5% | High power into ware, but high deviation across ware |
| T-shaped slotted waveguide (4 cases) | 17.8 | 18.1% | 17.6% | High power into ware and low deviation across ware |

As the data in Tables 1 and 2 suggest, about forty (40) % more power is directed into the ware using the slotted waveguides of the present invention as compared to the prior art standard port designs. There is a significant difference between the power in the ware using prior art ports (about 12.7 specific absorption rate ("SAR"), representing the average of 3 cases), prior art straight slotted waveguides (about 17.1 SAR, representing the average of 5 cases), and T or bent slotted waveguides of the present invention (about 17.8 SAR, representing the average of 4 cases).

While the straight slotted waveguides provide similar power to the ware, a more uniform field density is achieved using the T shaped slotted waveguides. Along both rows and columns, the T shaped slotted waveguides show the least difference in SAR (averages of about 18.0% and about 17.6%) compared with straight slotted waveguides (averages of about 31.4% and about 23.5%). This represents an about 42% decrease in the deviation along the rows, as well as an about 25% decrease in deviation along the columns. See Table 2 for the source averaged results.

The standard feed port design shows comparable deviation (averages of about 18.3% and about 19.3%) to that achieved using the T shaped slotted waveguide of the present invention. However, as noted above, the standard feed port design directs much less power into the ware when compared to the present invention.

It should be understood that while the present invention has been described in detail with respect to certain illustrative and specific embodiments thereof, it is will be appreciated by those skilled in the art that numerous modifications are possible without departing from the broad spirit and scope of the present invention as defined in the appended claims.

What is claimed is:

1. A method for processing a ceramic material comprising:
    placing the ceramic material in a microwave heating apparatus having a microwave cavity;
    subjecting the ceramic material to a combination of microwave radiation and conventional convective or radiative heating; and
    controlling the uniformity of the processing of the ceramic material so as to avoid deformations and cracking by applying the microwave radiation to the ceramic material through at least one branched slotted waveguide which substantially uniformly distributes the microwave radiation throughout the microwave cavity.

2. The method of claim 1, wherein the microwave radiation has a power deviation across a row of ceramic articles in the microwave cavity at a power level into the ceramic articles above about $15 \times 10^{-1}$ mW/m² that is no greater than about 25%.

3. The method of claim 1, wherein the power level into the ceramic articles is above about $17.5 \times 10^{-1}$ mW/m² and power deviation is at or below about 17%.

4. The method of claim 1, wherein controlling the uniformity of the processing of the ceramic material comprises selecting the desired number of slots in the waveguide so as to substantially uniformly distribute the microwave radiation throughout the microwave cavity.

5. The method of claim 1, wherein controlling the uniformity of the processing of the ceramic material comprises selecting the desired size of the slots in the waveguide so as to substantially uniformly distribute the microwave radiation throughout the microwave cavity.

6. The method of claim 1, wherein controlling the uniformity of the processing of the ceramic material comprises selecting the desired location of the slots in the waveguide so as to substantially uniformly distribute the microwave radiation throughout the microwave cavity.

7. The method of claim 1, wherein controlling the uniformity of the processing of the ceramic material comprises providing at least one branched "T" waveguide.

8. The method of claim 7, wherein controlling the uniformity of the processing of the ceramic material comprises selecting the desired number of slots in the branched waveguide so as to substantially uniformly distribute the microwave radiation throughout the microwave cavity.

9. The method of claim 7, wherein controlling the uniformity of the processing of the ceramic material comprises selecting the desired size of the slots in the branched waveguide so as to substantially uniformly distribute the microwave radiation throughout the microwave cavity.

10. The method of claim 7, wherein controlling the uniformity of the processing of the ceramic material comprises selecting the desired location of the slots in the branched waveguide so as to substantially uniformly distribute the microwave radiation throughout the microwave cavity.

11. The method of claim 7, wherein the branched waveguide is coupled through coupling holes.

12. The method of claim 1, wherein said slotted waveguide comprises a support structure of the microwave cavity.

13. The method of claim 1, further comprising maintaining a moisture containing atmosphere in the microwave cavity.

14. An apparatus comprising:
   a conventional convective or radiative heat source in communication with a microwave cavity; and
   a microwave power source in communication with the microwave cavity through at least one branched slotted waveguide, which substantially uniformly distributes the microwave radiation throughout the microwave cavity.

15. The apparatus of claim 14, wherein, at a power level into a plurality of ceramic articles within the microwave cavity above about $15 \times 10^{-1}$ mW/m², the maximum power deviation across a row of ceramic articles in the microwave cavity is no greater than about 25%.

16. The apparatus of claim 15, wherein, at a power into the ceramic articles above about $17.5 \times 10^{-1}$ mW/m², the maximum power deviation is at or below about 17%.

* * * * *

UNITED STATES PATENT AND TRADEMARK OFFICE
CERTIFICATE OF CORRECTION

PATENT NO. : 6,583,394 B2
DATED : June 24, 2003
INVENTOR(S) : Araya et al.

It is certified that error appears in the above-identified patent and that said Letters Patent is hereby corrected as shown below:

Column 10,
Line 66, "$15 \times 10^{-1}$" should be -- $15 \times 10^{-3}$ --.

Column 11,
Line 2, "$15 \times 10^{-1}$" should be -- $15 \times 10^{-3}$ --.

Column 12,
Lines 26 and 30, "$15 \times 10^{-1}$" should be -- $15 \times 10^{-3}$ --.

Signed and Sealed this

Ninth Day of December, 2003

JAMES E. ROGAN
*Director of the United States Patent and Trademark Office*